United States Patent
Erdler et al.

(10) Patent No.: US 10,605,683 B2
(45) Date of Patent: Mar. 31, 2020

(54) PRESSURE SENSOR ARRANGEMENT HAVING ROTATING ARTICULATION INCLUDING STRAIN GAUGES

(71) Applicant: Siemens Aktiengesellschaft, Munich (DE)

(72) Inventors: Gilbert Alexander Erdler, Ettlingen (DE); Stefan Von Dosky, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 144 days.

(21) Appl. No.: 15/756,123

(22) PCT Filed: Apr. 12, 2016

(86) PCT No.: PCT/EP2016/057979
§ 371 (c)(1),
(2) Date: Feb. 28, 2018

(87) PCT Pub. No.: WO2017/036613
PCT Pub. Date: Mar. 9, 2017

(65) Prior Publication Data
US 2018/0245999 A1 Aug. 30, 2018

(30) Foreign Application Priority Data
Aug. 31, 2015 (DE) .................. 10 2015 216 626

(51) Int. Cl.
G01L 9/00 (2006.01)
G01L 13/02 (2006.01)
G01L 23/18 (2006.01)

(52) U.S. Cl.
CPC .......... *G01L 9/0064* (2013.01); *G01L 13/025* (2013.01); *G01L 23/18* (2013.01); *G01L 9/0052* (2013.01)

(58) Field of Classification Search
CPC ... G01L 9/0064; G01L 9/0052; G01L 13/025; G01L 23/18; G01L 7/08
See application file for complete search history.

(56) References Cited

U.S. PATENT DOCUMENTS

| 3,303,451 A | 2/1967 | Yuan |
| 3,505,875 A | 4/1970 | Benner |

(Continued)

FOREIGN PATENT DOCUMENTS

| CN | 1987389 | 6/2007 |
| CN | 101939627 | 1/2011 |

(Continued)

OTHER PUBLICATIONS

Office Action dated Jun. 27, 2019 issued in Chinese Patent Application No. 201680049956.8.

*Primary Examiner* — Harshad R Patel
*Assistant Examiner* — Nigel H Plumb
(74) *Attorney, Agent, or Firm* — Cozen O'Connor

(57) ABSTRACT

A pressure sensor arrangement includes a tube with a diaphragm to pressure to be measured is applied arranged in the cross-section of the tube, wherein the diaphragm is fastened to the tube inner wall via an articulation extending along the circumferential region of the diaphragm, where deformation of the diaphragm results in rotation of the articulation directly on the wall of the tube which can therefore be detected from the outside by suitable structure such that that strain sensors, for example, which can be used to detect deformation are advantageously not in contact with the process medium and there is advantageously no need for a pressure-tight bushing for electrical signals, and where the pressure sensor arrangement has a particularly simple structure and can be advantageously used in measuring transducers for process instrumentation.

3 Claims, 3 Drawing Sheets

(56) References Cited

U.S. PATENT DOCUMENTS

| | | | |
|---|---|---|---|
| 4,998,179 | A | 3/1991 | Grantham et al. |
| 5,157,973 | A | 10/1992 | Ciminelli |
| 5,763,784 | A | 6/1998 | Biskup |
| 2010/0300215 | A1 | 12/2010 | Juul |
| 2011/0167918 | A1 | 7/2011 | Dukart et al. |
| 2014/0201968 | A1 | 7/2014 | Karst et al. |

FOREIGN PATENT DOCUMENTS

| | | |
|---|---|---|
| DE | 3310538 | 9/1984 |
| DE | 69007516 | 8/1994 |
| DE | 19608321 | 8/1997 |
| DE | 20313930 U1 | 11/2003 |
| DE | 102008002671 | 12/2009 |
| EP | 1114987 | 7/2001 |
| EP | 2294376 | 3/2011 |
| NL | 6516420 | 6/1966 |

PRESSURE SENSOR ARRANGEMENT HAVING ROTATING ARTICULATION INCLUDING STRAIN GAUGES

CROSS-REFERENCE TO RELATED APPLICATIONS

This is a U.S. national stage of application No. PCT/EP2016/057979 filed Apr. 12, 2016. Priority is claimed on German Application No. DE102015216626.0 filed Aug. 31, 2015, the content of which is incorporated herein by reference in its entirety.

BACKGROUND OF THE INVENTION

1. Field of the Invention

The invention relates to a pressure sensor arrangement comprising a tube having a diaphragm to which pressure to be measured is applied disposed in a cross-section of the tube, and to a measuring transducer for process instrumentation having the pressure sensor arrangement.

2. Description of the Related Art

In industrial process plants, a variety of field devices for process instrumentation are used to control processes. Measuring transducers are used to detect process variables such as temperature, pressure, flow rate, fill level, density or gas concentration of a medium. The process flow can be influenced by final control elements as a function of detected process variables according to a strategy predefined, e.g., by a programmable controller or a control station. A control valve, heater or pump are examples of final control elements. Particularly in process plants, pressure measuring transducers are essential sensing components in the context of automated production processes. To ensure optimum plant behavior and continuously high product quality, high-quality measuring transducers are necessary which, even under extreme conditions, provide measured values that have long-term stability and are subject to minimal error.

DE 196 08 321 C2 discloses a pressure sensor arrangement having an overload protection system and which can be used as a detector or measuring cell in a differential pressure measuring transducer. The disclosed measuring cell is oil-filled so that the actual pressure sensor is separated from any aggressive process medium. The overload protection system consists of a plurality of mutually corresponding diaphragms and an oil fill precisely matched thereto. The design of such a measuring cell is therefore comparatively complex and a large number of welding processes are required to manufacture the measuring cell. In addition, the tolerance chains of the part geometry, material properties and welding parameters have to meet exacting accuracy requirements. The electrical connections of the actual pressure sensor have to pass via high-pressure resistant glass feedthroughs from the pressurized interior of the measuring cell out to an electronics unit in which signal processing is performed to determine the measured pressure value.

EP 2 294 376 B1 discloses another pressure sensor arrangement. Here, a diaphragm having a plurality of diaphragm sections angled to one another is used for measuring the pressure. One diaphragm section is arranged as a separating diaphragm in the cross section of a pressure tube and a diaphragm section angled thereto as a sidewall diaphragm in the region of the pressure tube wall. A pressure difference present on the separating diaphragm causes deformation thereof which is transmitted to the sidewall diaphragm due to a fixed angle between the two diaphragm sections, so that the resulting deformation of the sidewall diaphragm likewise reflects the pressure conditions inside the pressure tube. Means for measuring diaphragm deformation are disposed on the outer side of the sidewall diaphragm so that they are not in contact with the medium whose pressure is to be measured. As a result of the disposition of the first diaphragm section as a separating diaphragm in the cross section of the tube, the disclosed pressure sensor arrangement can be used both as an absolute pressure sensor and as a differential pressure sensor, depending on whether a defined reference pressure is applied to one side of the separating diaphragm or the separating membrane has measurement pressure applied to it on both sides. The conventional pressure sensor arrangement is designed for use in the context of monitoring diesel particle filters to measure an exhaust gas before and after a particle filter and thus determine its loading state. Unlike in process instrumentation, an at most low static pressure occurs here. However, in the case of the pressure sensor arrangement described, the differential pressure measurement is disadvantageously heavily dependent on the static pressure that particularly results in deformation of the sidewall diaphragm and compensation of which is only possible to an unsatisfactory extent, because this requires exact positioning of the strain gauges applied to the tube's outer wall that is in practice difficult to achieve with the required accuracy.

SUMMARY OF THE INVENTION

In view of the foregoing, it is an object of the invention to provide a pressure sensor arrangement that is mechanically simple and at the same time is suitable for use in a measuring transducer for process instrumentation.

This and other objects and advantages are achieved in accordance with the invention by a pressure sensor arrangement comprising a tube having a diaphragm to which pressure to be measured is applied disposed in a cross-section of the tube, and by a measuring transducer for process instrumentation having such a pressure sensor arrangement.

The advantage of the invention is that rotation of a flexure bearing, i.e., changing of the angle between the outer region of the diaphragm and the inner wall of the tube, occurs close to the tube wall, thereby making it possible to measure the rotation externally. Particularly compared to the pressure sensor arrangement disclosed in DE 196 08 321 C2 mentioned in the introduction, the advantage of the new arrangement having a tube, in which a diaphragm to which the pressure to be measured is applied is disposed in the cross-section of the tube, is that its mechanical design is significantly simpler, because no oil fill, no corresponding overload protection system, no pressure-resistant glass feedthrough, and no welded flexure bearings are required. A sensor for measuring the rotation of the flexure bearing can be advantageously disposed outside the chamber in contact with the medium, thereby preventing any interaction between sensor and filling oil or process medium. This provides a pressure sensor arrangement having high long-term stability and rugged design. In addition, because the diaphragm is not subject to static pressure, there is no risk of the pressure sensor arrangement becoming overloaded. The tube and diaphragm can be produced comparatively inexpensively from steel as a one-piece component mainly by a turning process.

In a particularly advantageous embodiment of the invention, in order to implement the flexure bearing, the diaphragm is thinner in its peripheral region than in its central region, which then represents the actual diaphragm. The advantage of this is that, because the material is less thick, the edge zone has lower flexural strength, resulting in mounting of the diaphragm via a flexure bearing. In this way, a flexure bearing having a particularly simple configuration and low manufacturing cost is obtained. The function of the flexure bearing is thus achieved by the edge region of reduced flexural strength relative to the adjacent region of greater thickness representing the actual diaphragm, and relative to the tube of higher flexural strength adjacent to the other side.

In accordance with another advantageous embodiment, the outer wall of the tube is provided with a recess for locally reducing the tube thickness in a region opposite the diaphragm. The region of reduced flexural strength by which the flexure bearing is implemented as a flexure bearing therefore extends partially into the tube wall such that, in the local region of the recess, the latter also assumes at least partially the function of the flexure bearing. The rotation of the flexure bearing therefore also manifests itself on the outside of the tube as a surface strain or compression and can therefore be measured externally in a particularly simple manner.

High sensitivity for measuring the diaphragm deformation, without having to bring the transducer required for this purpose into contact with a process fluid, can be advantageously achieved if a strain sensor is disposed in the recess on the outside of the tube to measure a surface strain as a function of the rotation of the flexure bearing.

A reduction in material fatigue in long-term use and therefore a longer service life of the pressure sensor arrangement can advantageously be achieved if the recess is provided with a gap running centrally with respect to the plane of the diaphragm and partially protruding in the diaphragm, where the width of the gap is less than the diaphragm thickness. A gap width of between a third and a half of the diaphragm thickness has been found to be particularly advantageous, here. This measure reduces the flexural strength particularly in the diaphragm's outermost edge region in which the diaphragm abuts the tube wall.

Because of its robustness, pressure resistance and insensitivity to static pressure, the pressure sensor arrangement is particularly suitable for use as a measuring cell or detector in a measuring transducer for process instrumentation.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention as well as embodiments and advantages will now be explained in greater detail with reference to the accompanying drawings in which an exemplary embodiment of the invention is illustrated, in which.

DETAILED DESCRIPTION OF THE EXEMPLARY EMBODIMENTS

Figure 1:
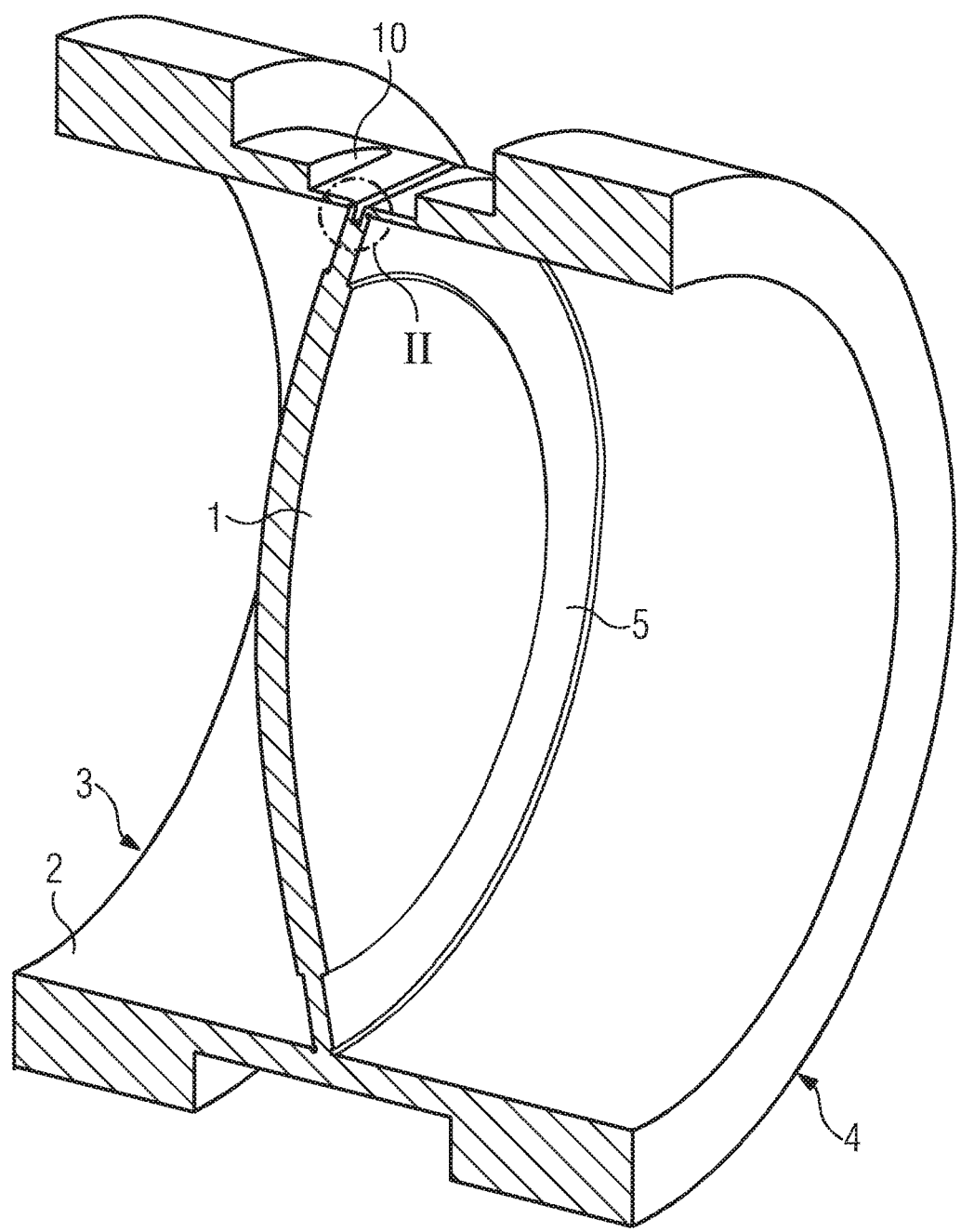
FIG. 1 shows a sectional view of a pressure sensor arrangement in accordance with the invention.

Identical parts are provided with the same reference characters in the figures.

The basic arrangement of a diaphragm 1 in the cross section of a tube 2 is clearly visible in the longitudinal section shown in FIG. 1. When the illustrated pressure sensor arrangement is used in a pressure measuring transducer for process instrumentation, the two ends 3 and 4 of tube 2 can each be sealed by a cap (not shown in FIG. 1) via which a process medium having the pressure to be measured can be supplied to one side of the diaphragm 1, in the case of an absolute pressure sensor, or to both sides of the diaphragm 1, in the case of a differential pressure sensor. An electronics unit for evaluating the electrical signals produced by the pressure sensor arrangement that are dependent on the pressure to be measured can be of conventional design and is likewise not shown in FIG. 1. It is clear from FIG. 1 that the mechanical configuration of a differential pressure measuring cell using a diaphragm 1 connected to the inner wall of the tube 2 via a flexure bearing 5 is significantly simplified when compared to a conventional measuring cell with overload protection system. In the case of a differential pressure measuring transducer, the process medium is applied directly to both sides of the diaphragm 1, no oil fill and no complex configuration of an overload protection system is required, and welding processes and a pressure-resistant glass feedthrough for electrical signals can be dispensed with. In addition, the tube 2 and diaphragm 1 can be largely made from one piece by turning. The dimensions of the measuring cell can be configured such that it is compatible with conventional measuring cells with respect to its mechanical interfaces to the other components of a measuring transducer, such that only the measuring cell, i.e., the pressure sensor arrangement shown, needs to be replaced and the flange sections, or housing, can be taken over from the conventional measuring transducer.

In a practical implementation, the tube 2 and diaphragm 1 are made of steel, for example, where the diaphragm 1 is approximately 2 mm thick and has a diameter of approximately 55 mm.

Figure 2:
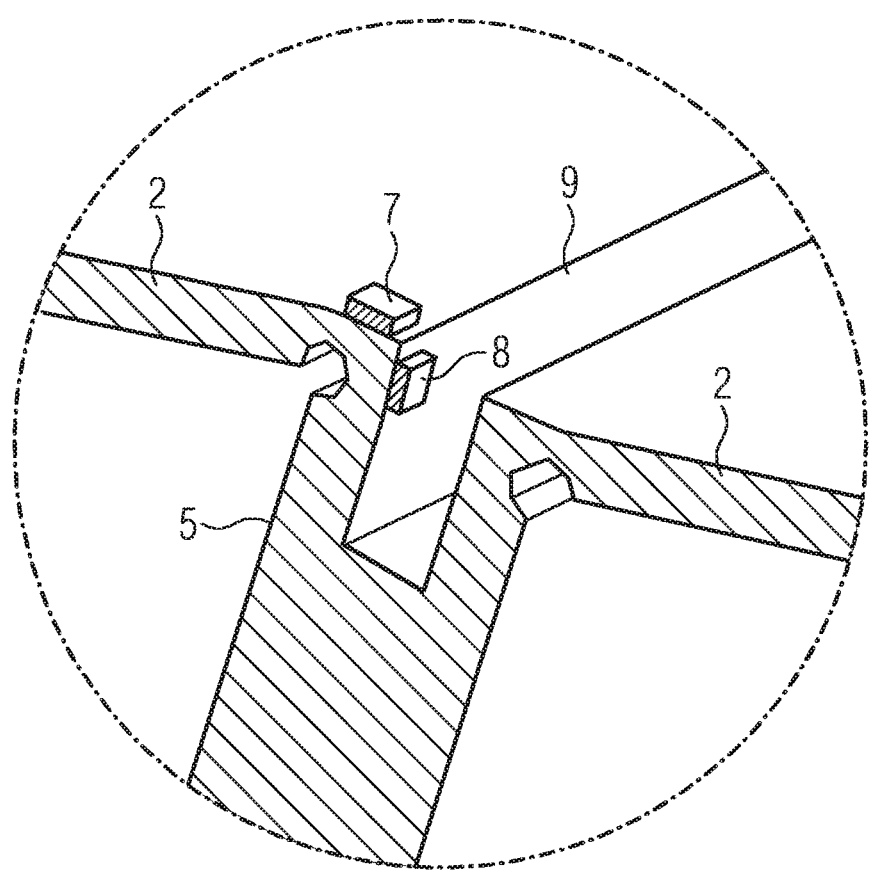
FIG. 2 shows an enlarged detail of the pressure sensor arrangement of FIG. 1.

FIG. 2 shows an enlargement of the detail II from FIG. 1 in which, in particular, possibilities for the mounting of means 7 and/or 8 for measuring the pressure-dependent deformation of the diaphragm 1 are indicated. Self-evidently, in a practical implementation, the mounting of a single strain gauge 7/8 is sufficient to produce electrical signals that can be evaluated by an electronics unit (not shown) to determine a pressure value. The strain gauge 7 and/or 8 can be applied by long-term stable, non-creep glass-bonding to the material used for the tube 2, such as stainless steel. A very small, quasi selectively measuring piezoresistive strain sensor is preferably used that is implemented as a Wheatstone full bridge. Consequently, because of the very compact design, spatial temperature gradients across the comparatively large, possibly poorly conducting (depending on the material) tube 2 of the measuring cell have only minimal effect on the measurement.

FIGS. 1 and 2 show a state in which the pressure of the process medium on the right-hand side of the diaphragm 1 is significantly higher than on the left-hand side. This causes the diaphragm to be deflected to the left and the flexure bearing 5 to rotate, as may be clearly seen in FIG. 2. The rotation of the flexure bearing 5 can be detected with a high sensitivity via the strain gauges 7 and/or 8 that are positioned in the region of the greatest mechanical stresses. The pressure applied to the diaphragm 1 is essentially proportional to the mechanical stresses measurable on the outer wall of the tube 2. A recess 10 (FIG. 1) causes the thickness of the wall of the tube 2 to be locally reduced in the region established for mounting the means 7, 8, i.e., for measuring the deformation. In addition, the gap 9 is partially incorporated centrally with respect to the plane of the diaphragm 1 into the region of the flexure bearing 5. The advantage of this is that the region of reduced flexural strength by which the flexure bearing is implemented between diaphragm 1 and tube 2 extends partially into the tube wall, so that it partly assumes the function of the flexure bearing. In addition, shear stresses in the outer region of the flexure bearing are reduced by the gap 9. When the pressure sensor arrangement is used in a measuring transducer for process instrumentation, for safety reasons a stable cap that prevents any escape of the process fluid into the electronics case at the thinned location in the event of rupturing of the tube wall can be provided, if necessary, in a neck that is welded above the recess 10 to connect the electronics case to the tube 2.

It is particularly clear from FIG. 2 that, due to the implementation of a flexure bearing 5 in the region between the diaphragm 1 and the wall of the tube 2 and supplementally due to the recess 10 in the wall, the deflection of the diaphragm 1 proportional to the differential pressure is directed outward from the region of the inside of the tube that is in contact with the medium. In the region of maximum mechanical strain which, because of the particular configuration of the pressure sensor arrangement, assumes high values, strain sensors 7 and/or 8 can be applied, which convert the mechanical strain into an electrical signal proportional to the deflection of the diaphragm 1. Compared to conventionally designed measuring cells of pressure measuring transducers for process instrumentation, such a configuration of a measuring cell therefore provides significant advantages which are briefly summarized as follows: (i) no overload protection system with oil filling necessary, (ii) a simple inexpensive configuration for volume production, (iii) a strain sensor outside the chamber in contact with the medium, (iv) therefore no reaction with the filling oil and rugged design, (v) diaphragm is not subjected to static pressure and therefore no risk of overloading the pressure sensor arrangement, (vi) no pressure-resistant glass feedthrough necessary to bring about electrical signals from the pressurized interior of the measuring cell, significant reduction in the number of components required, (vii) no tightly toleranced welding processes for steel diaphragms, and (viii) good temperature compensation when using strain sensors with full-bridge circuit.

In an embodiment of the described detection by the strain gauges 7 and/or 8 of rotation of the flexure bearing 5 which is implemented in the exemplary embodiment by a tapering of the diaphragm 1 in its edge region, the rotation could alternatively or additionally be measured by a pointer that is fixed, for example, to the bottom of the gap 9 and, protruding from the gap 9, directs the rotation outward. Yet more embodiments, not explained in greater detail, for detecting the rotation are conceivable within the scope of the invention.

Figure 3:
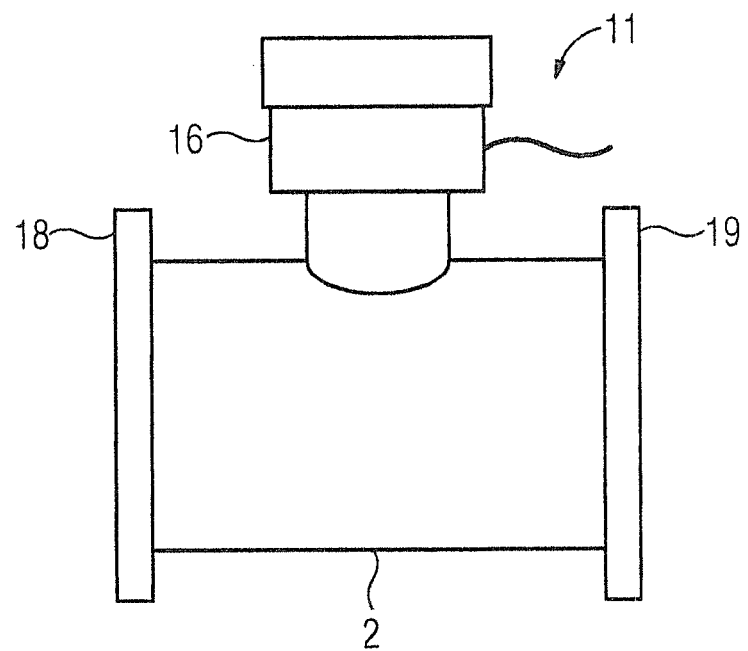
FIG. 3 is an illustration of a measuring transducer with the pressure sensor arrangement.

FIG. 3 shows a measuring transducer 11 for process instrumentation with the tube 2 containing the measuring diaphragm that is not visible here and provided with mounting flanges 18, 19 and a measuring head 16 containing the measuring electronics.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those structures and/or elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A pressure sensor arrangement comprising: a tube; a diaphragm to which the pressure to be measured is applied disposed in a cross-section of the tube; a flexure bearing extending along a circumferential region of the diaphragm and fastening the diaphragm to an inner wall of the tube; and means for detecting a rotation of the flexure bearing as a function of a deformation of the diaphragm; a gap disposed in a recess, said gap extending centrally with respect to the diaphragm; partly protruding into the diaphragm and having a width which is significantly less than the diaphragm thickness; wherein an outer wall of the tube is provided with the recess to reduce a thickness of the tube in a region opposite the diaphragm: and wherein the means for detecting a rotation of the flexure bearing as a function of the deformation of the diaphragm comprises a strain sensor disposed in the recess on an outside of the tube to detect a surface strain as a function of the rotation of the flexure bearing.

2. The pressure sensor arrangement as claimed in claim 1, wherein the diaphragm for implementing the flexure bearing is thinner in its circumferential region than in its central region.

3. The pressure sensor arrangement as claimed in claim 1, further comprising:
   a measuring head containing measuring electronics and forming a measuring transducer for process instrumentation.

* * * * *